July 25, 1950 I. STRAUSS ET AL 2,516,353

RECORD PLAYER

Filed May 26, 1945 2 Sheets-Sheet 1

INVENTORS
Irving Strauss &
Gerald O. Kaye

BY J. B. Felshin
ATTORNEY.

July 25, 1950 I. STRAUSS ET AL 2,516,353

RECORD PLAYER

Filed May 26, 1945 2 Sheets-Sheet 2

Irving Strauss
Gerald O. Kaye
INVENTORS

BY

J. B. Felshin
ATTORNEY.

Patented July 25, 1950 2,516,353

UNITED STATES PATENT OFFICE 2,516,353

RECORD PLAYER

Irving Strauss, Bridgeport, Conn., and Gerald O. Kaye, Forest Hills, N. Y., assignors to Tone Products Corporation of America, New York, N. Y.

Application May 26, 1945, Serial No. 595,976

9 Claims. (Cl. 179—100.4)

This invention relates to record players.

An object of this invention is to provide a device of the character described comprising a base, a turntable rotatably mounted thereon, and a skirted member attached to the turntable and rotating therewith and serving as a casing for the motor drive for the turntable and the turntable support.

Another object of this invention is to provide a device of the character described provided with a casing mounted on the base and spaced from the turntable, and containing a loud speaker and serving as a sound box therefor.

Yet a further object of this invention is to provide a device of the character described in which the sound box serves as a support for the tone arm and also serves as a mounting for the volume and power switch.

Yet a further object of this invention is to provide a device of the character described so constructed that the turntable simulates a carrousel and the sound box simulates a calliope.

Still a further object of this invention is to provide a device of the character described in which the base is formed with grooves on the underside thereof and with holes extending from the grooves to the upper surface of the base to receive the wiring for the various parts of the device.

Yet a further object of this invention is to provide a strong, rugged and durable device of the character described which shall be relatively inexpensive to manufacture, which shall be attractive in appearance, easy to assemble, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention:

Figure 1:
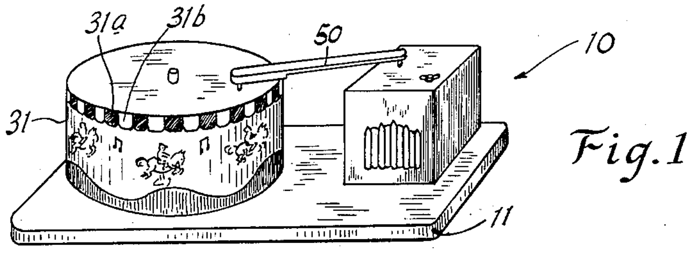
Fig. 1 is a perspective view of a device embodying the invention.
Figure 3:
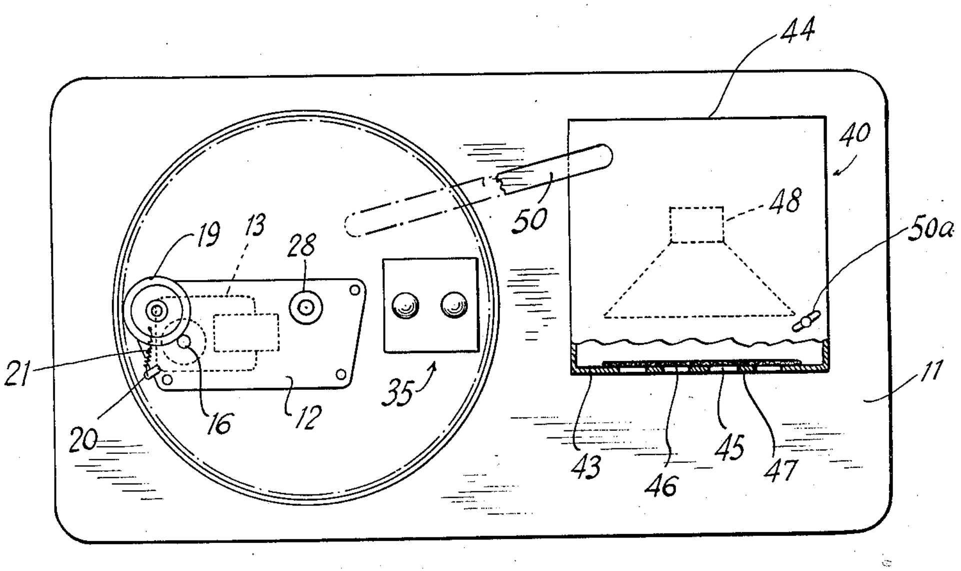
Fig. 3 is a top plan view with the turntable removed.
Figure 2:
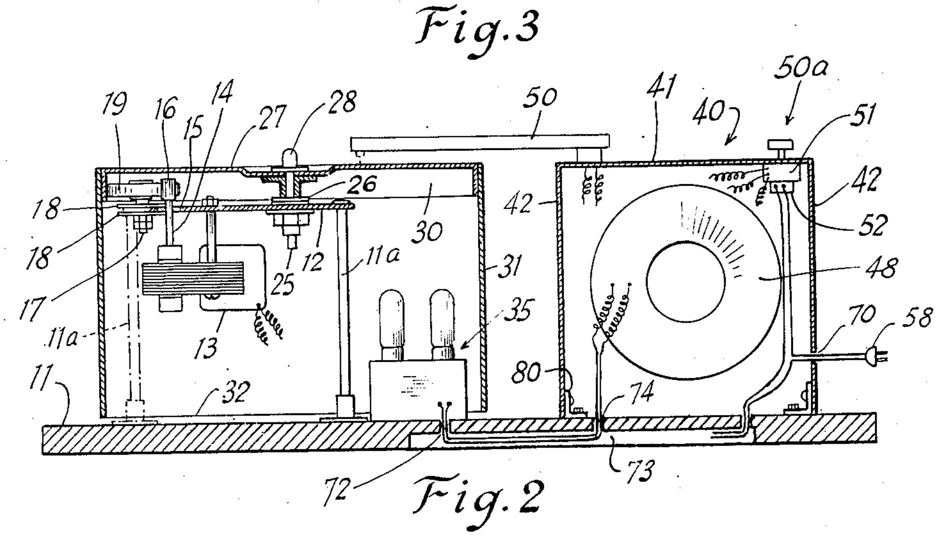
Fig. 2 is an elevational cross-sectional view thereof.
Figure 4:
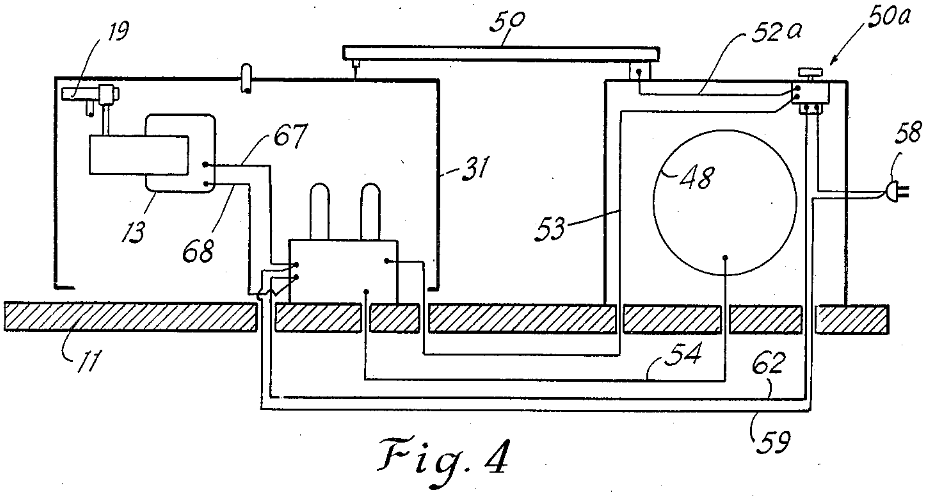
Fig. 4 is a diagrammatic view of the device in elevation.
Figure 5:
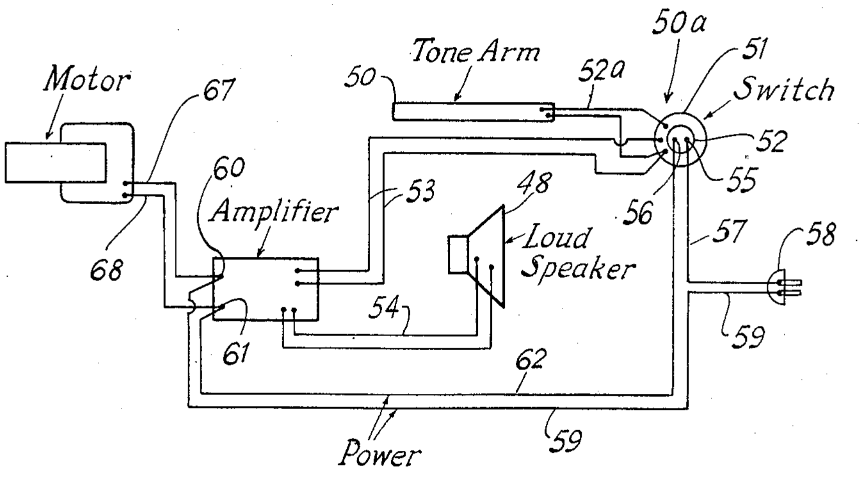
Fig. 5 is a wiring diagram illustrating the invention.

Referring now in detail to the drawing, 10 designates a record playing device embodying the invention. The same comprises a base 11. Mounted on the base 11 are a plurality of upstanding legs 11a supporting a horizontal plate 12. Fixed to plate 12 and depending therefrom is an electric motor 13, provided with an armature 14. The armature 14 passes through a hole 15 in plate 12. At the upper end of the armature 14 is a pin 16 for the purpose hereinafter appearing.

Plate 12 is formed with a through opening through which there extends a vertical shaft 17. Fixed to the shaft on opposite sides of plate 12 are washers 18. Journalled on the upper end of shaft 17 is a rubber wheel 19. Fixed to plate 12 is a bracket 20. Interconnecting the bracket with one of the washers 18 is a coil tension spring 21 for the purpose hereinafter appearing.

Rotatably mounted on plate 12 and extending upwardly therethrough is a vertical shaft or pin 25. Pin 25 is formed, above the plate 12, with a flange 26. Mounted on pin 25 and resting on flange 26 is a turntable 27. Screwed to the upper end of pin 25 is a nut 28 to affix the turntable to the pin. The turntable 27 is formed with a central opening through which pin 25 passes. The nut 28 presses the turntable to the flange 26 so that the turntable and pin 25 will rotate together freely. The turntable 27 is formed at its periphery with a downwardly extending annular flange 30. Fixed to the flange 30 and depending therefrom is a cylindrical, skirted member 31. The lower edge 32 of the cylinder 31 may be disposed just above the base 11.

It will now be understood that the spring 21 tends to pull the wheel 19 into engagement with both the pin 16 and the inner surface of the flange 30. When the motor 13 is energized, the armature shaft will rotate to turn pin 16 and thereby rotate the rubber wheel 19 which in turn rotates the turntable and skirted cylinder 31.

Mounted on the base 11 and below the turntable 30 is a radio amplifier 35. It will be noted that the amplifier 35 is located within the skirted cylinder 31 and is encased thereby. There is also mounted on the base 11, a sound box or casing 40 which is spaced from the turntable. The box 40 has a top wall 41, side walls 42, a front wall 43, and a rear wall 44. The front wall 43 may be decorated to simulate a calliope. It is formed with vertical slots 45. Attached to the inner surface of the front wall 43 is a screen or cloth 46. Between the slots 45 are strips 47 which may be painted to designate pipes of an organ or calliope.

Within the box 40 is an electrical loud speaker 48, the cone of which faces the front wall 43. Suitably mounted on the top wall 41 is a tone arm 50 for a record player which straddles across to the turntable and overlies the same. The tone arm is so constructed as to play records placed on the turntable.

There is furthermore mounted on top of the box 41 a switch 50*a* which comprises both a volume control section 51 and a power switch section 52. The loud speaker, the amplifier, the switch and the tone arm may be interconnected and wired in accordance with well known practice.

Thus the tone arm is connected by wiring 52*a* to the volume control section 51 of the switch. The amplifier is connected by input signal wires 53 to said volume control section of the switch. The loud speaker is connected by output signal wires 54 to the output terminals of the amplifier.

The power switch section 52 has two terminals 55 and 56. One terminal 55 is connected by wiring 57 to one terminal of a plug connector 58. The other terminal of the plug 58 is connected by wiring 59 to one power terminal 60 of the amplifier. The other power terminal 61 of the amplifier is connected by wire 62 to terminal 56 of switch section 52. The motor is connected in parallel, by wires 67 and 68, to the power terminals 60 and 61 of the amplifier. The wiring to the plug 58 comprises an electric cord which may pass through an opening 70 in one of the walls of the box 40.

It will now be understood that the wiring from the tone arm to the switch may be located within the box 40.

Base 11 is grooved as at 73 on its underside and is formed with openings 72 and 74 communicating with the groove and extending to the upper surface of the base.

The wiring from the amplifier to the loud speaker passes through opening 72 in the base below the turntable to groove 73 at the underside of the base; and through opening 74 in the base below the box 40. The input signal wire likewise passes down through an opening in the base located beneath the turntable and also passes through a groove at the underside of the base and up through an opening below the box 40. Also the power wires 59, 62 pass from the amplifier down through an opening in the base through a groove at the underside of the base and upwardly through an opening in the base to the underside of the box 40.

The box 40 may be attached to the base in any suitable manner as by means of angle brackets 80 at the inside of the box, or by screws extending through the base and upwardly into the walls of the box.

It will now be understood that the box 40 serves as a sound box as well as a housing for the loud speaker and as a support for the tone arm and switch 50*a*. If desired, amplifier 35 may be housed within the box 40 instead of below the turntable.

The outer surface of the cylindrical skirted member 31 may be formed with spaced spots or dark markings 31*a* which may be alternated with lighter markings 31*b*. The number of markings 31*a* are such as to produce a stroboscopic effect when the turntable rotates at the speed to which it is set to rotate, preferably 78 R. P. M.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described our invention, we claim as new and desire to secure by Letters Patent:

1. In combination, a base, a support on the base, a motor on the support, a turntable above said support, means on said support for mounting said turntable for rotation, means connected to the motor for rotating the turntable, a skirted member on the peripheral portion of the turntable, and depending therefrom and serving as a housing for said support and motor, a box mounted on said base and spaced from said turntable, and a tone arm mounted on said box and adapted to play a record on the turntable, and a speaker in said box, and an electric pickup on the tone arm wired to the speaker.

2. In combination, a base, a support on the base, a motor on the support, a turntable above said support, means on said support for mounting said turntable for rotation, means connected to the motor for rotating the turntable, a skirted member on the peripheral portion of the turntable, and depending therefrom and serving as a housing for said support and motor, a box mounted on said base and spaced from said turntable, a tone arm mounted on said box and adapted to play a record on the turntable, an electric pickup on said tone arm, an audio amplifier for amplifying sound from the pickup on said tone arm, mounted on the base and below the turntable and encased by said skirted member, and a loud speaker for said amplifier within said box, said pickup being wired to the amplifier and speaker.

3. In combination, a base, a support on the base, a motor on the support, a turntable above said support, means on said support for mounting said turntable for rotation, means connected to the motor for rotating the turntable, a skirted member on the peripheral portion of the turntable, and depending therefrom and serving as a housing for said support and motor, a box mounted on said base and spaced from said turntable, a tone arm mounted on said box and adapted to play a record on the turntable, an electric pickup on said tone arm, an audio amplifier for amplifying sound from the pickup on said tone arm, mounted on the base and below the turntable and encased by said skirted member, a loud speaker for said amplifier within said sound box, a switch having a volume control section and power section and mounted on said box, and wiring connecting the pickup on the tone arm and said switch and disposed within said box, input signal wiring interconnecting said amplifier with said switch, said base being formed with a groove at the underside thereof and with openings extending from the groove to the upper surface of the base below the box and turntable, respectively, said input signal wiring passing through said openings and groove.

4. In combination, a base, a support on the base, a motor on the support, a turntable above said support, means on said support for mounting said turntable for rotation, means connected to the motor for rotating the turntable, a skirted member on the peripheral portion of the turntable, and depending therefrom and serving as a housing for said support and motor, a box mounted on said base and spaced from said turntable, a tone arm mounted on said box and adapted to play a record on the turntable, an electric pickup on said tone arm, an audio amplifier for amplifying sound from the pickup on said tone arm, mounted on the base and below the turntable and encased by said skirted member, a loud speaker for said amplifier within said sound box, a switch having a volume control section and power section and mounted on said box, wiring connecting the pickup on the tone arm and said switch and disposed within said box, input signal wiring interconnecting said amplifier with said switch, said base being formed with a groove at the underside thereof and with openings extending from the groove to the upper surface of the base below the box and turntable, respectively, said input signal wiring passing through said openings and groove, and output signal wiring interconnecting said amplifier and loud speaker, and passing through openings in the base and disposed within the groove formed on the underside of the base.

5. In combination, a base, a support on the base, a motor on the support, a turntable above said support, means on said support for mounting said turntable for rotation, means connected to the motor for rotating the turntable, a skirted member on the peripheral portion of the turntable, and depending therefrom and serving as a housing for said support and motor, a box mounted on said base and spaced from said turntable, a tone arm mounted on said box and adapted to play a record on the turntable, an electric pickup on said tone arm, an audio amplifier for amplifying sound from the pickup on said tone arm, mounted on the base and below the turntable and encased by said skirted member, a loud speaker for said amplifier within said sound box, a switch having a volume control section and power section and mounted on said box, wiring connecting the pickup on the tone arm and said switch and disposed within said box, input signal wiring interconnecting said amplifier with said switch, said base being formed with a groove at the underside thereof and with openings extending from the groove to the upper surface of the base below the box and turntable, respectively, said input signal wiring passing through said openings and groove, and output signal wiring interconnecting said amplifier and loud speaker, and passing through openings in the base and disposed within the groove formed on the underside of the base, said motor being connected in parallel circuit with said amplifier, said amplifier being connected to the power switch section of said switch and to an electric cord connector, by wiring extending through openings in the base, and within the groove at the underside of the base, said cord connector passing through an opening in said box.

6. A record player comprising a base, a turntable mounted for rotation on said base, a cylindrical member attached to the turntable for rotation therewith, and motor means for rotating said turntable and located between the turntable and the base, said skirted member serving as a housing for said motor means, a box mounted on the base and spaced from said turntable, a speaker in the box and a tone arm mounted on the box for playing records an electric pickup arm, said tone arm adapted to play records on the turntable, and being wired to the speaker.

7. A record player comprising a base, a plurality of upstanding legs on the base, a horizontal plate, supported at the upper ends of the upstanding legs, a turntable, means on the plate for supporting said turntable for rotation about a vertical axis, an electric motor suspended from said plate, said turntable having a downwardly extending flange at its periphery, means operatively connected to the motor and engaging the inner surface of the flange for rotating the turntable, and a cylindrical member being closely above the base so that said legs, plate, motor and rotating means are housed within said cylindrical member and disposed below the turntable, a box on the base and spaced from the turntable, the upper end of the box being substantially at the level of the turntable, a tone arm mounted at one end of the top of the box and straddling the space between the box and the turntable, and an elecric pickup on the tone arm for playing records on the turntable, a speaker within the box, an audio amplifier on the base and below the turntable and housed by said cylindrical member, wiring interconnecting the electric pickup with the speaker and amplifier in circuit, part of said wiring extending beneath the base.

8. A record player comprising a base, a plurality of upstanding legs on the base, a horizontal plate, supported at the upper ends of the upstanding legs, a turntable, means on the plate for supporting said turntable for rotation about a vertical axis, an electric motor suspended from said plate, said turntable having a downwardly extending flange at its periphery, means operatively connected to the motor and engaging the inner surface of the flange for rotating the turntable, and a cylindrical member being closely above the base so that said legs, plate, motor and rotating means are housed within said cylindrical member and disposed below the turntable, a box on the base and spaced from the turntable, the upper end of the box being substantially at the level of the turntable, a tone arm mounted at one end of the top of the box and straddling the space between the box and the turntable, and an electric pickup on the tone arm for playing records on the turntable, a speaker within the box, an audio amplifier on the base and below the turntable and housed by said cylindrical member, wiring interconnecting the electric pickup with the speaker and amplifier in circuit, part of said wiring extending beneath the base, and a switch controlling the circuit for said tone arm, amplifier and speaker and mounted on the top of said box.

9. A record player comprising a base, a turntable mounted for rotation on said base, a cylindrical member attached to the turntable for rotation therewith, and motor means for rotating said turntable and located between the turntable and the base, said cylindrical member serving as a housing for said motor means, a box on the base and spaced from the turntable, a speaker within the box, a tone arm on the box, an electrical pickup on the tone arm adapted to play records on the turntable, and means on the base and housed by the cylindrical member to amplify the electrical output from the electrical pickup.

IRVING STRAUSS.
GERALD O. KAYE.

REFERENCES CITED

The following references are of record in the file of this patent:

UNITED STATES PATENTS

| Number | Name | Date |
|---|---|---|
| D. 144,948 | Strauss et al. | June 4, 1946 |
| 1,070,959 | Hibbard | Aug. 19, 1913 |
| 1,388,033 | Gates | Aug. 16, 1921 |
| 1,461,859 | Amor | July 17, 1923 |
| 1,529,306 | Hanson | Mar. 10, 1925 |
| 1,580,037 | Hall | Apr. 6, 1926 |
| 1,586,596 | Barrows | June 1, 1926 |
| 1,601,425 | Bristol | Sept. 28, 1926 |
| 1,641,136 | Dorn | Aug. 30, 1927 |
| 1,930,544 | Victor | Oct. 17, 1933 |
| 1,975,592 | Solodar | Oct. 2, 1934 |
| 2,017,420 | Paulero et al. | Oct. 15, 1935 |
| 2,094,246 | Suomala | Sept. 28, 1937 |
| 2,120,307 | Baker | June 14, 1938 |
| 2,230,003 | Mitchell | Jan. 28, 1941 |
| 2,247,171 | Harman | June 24, 1941 |